(12) United States Patent
Honda et al.

(10) Patent No.: US 12,172,563 B2
(45) Date of Patent: Dec. 24, 2024

(54) VEHICLE SEAT

(71) Applicant: NHK SPRING CO., LTD., Yokohama (JP)

(72) Inventors: Chikanori Honda, Yokohama (JP); Kousuke Suzuki, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 98 days.

(21) Appl. No.: 18/184,594

(22) Filed: Mar. 15, 2023

(65) Prior Publication Data
US 2023/0302979 A1   Sep. 28, 2023

(30) Foreign Application Priority Data

Mar. 25, 2022 (JP) ................. 2022-049755

(51) Int. Cl.
*B60N 2/80* (2018.01)
*A47C 7/38* (2006.01)
(Continued)

(52) U.S. Cl.
CPC ............ *B60N 2/80* (2018.02); *A47C 7/383* (2013.01); *A47G 9/1081* (2013.01); *B60N 2/885* (2018.02);
(Continued)

(58) Field of Classification Search
CPC .. A47G 9/1081; B64D 11/0642; A47C 7/383; B60N 2/80; B60N 2/885; B60N 2/891
See application file for complete search history.

(56) References Cited

U.S. PATENT DOCUMENTS

| | | | |
|---|---|---|---|
| 7,168,765 B2* | 1/2007 | Meiller | B60N 2/242 |
| | | | 297/452.34 |
| 7,331,631 B1* | 2/2008 | Yeh | B61D 33/0035 |
| | | | 5/636 |

(Continued)

FOREIGN PATENT DOCUMENTS

| | | |
|---|---|---|
| JP | H05-24051 A | 2/1993 |
| JP | 2016-132299 A | 7/2016 |

*Primary Examiner* — Syed A Islam
(74) *Attorney, Agent, or Firm* — Knobbe, Martens, Olson & Bear, LLP

(57) ABSTRACT

A headrest includes a first configuration section comprising a hard urethane and formed with an indentation in a front face, the indentation enabling entry of a supported portion, and the supported portion being a location corresponding to an occipital bone of the head of the seated occupant; and a second configuration section comprising a soft urethane having a lower rigidity than the hard urethane, the second configuration section being provided at the indentation so as to be deformed by the supported portion. Part of the first configuration section, which is a bottom face of the indentation, is configured by a left-right pair of head support faces that support the supported portion and that are connected together at a connection location having a straight line shape. An angle formed between cross-sections of the left and right head support faces when sectioned along a plane perpendicular to the connection location is a first angle that is from 37.2° to 143°. An angle formed between a direction perpendicular to the connection location and a seat front-rear direction when viewed along a seat left-right direction is a second angle that is from 12.8° to 68.7°.

3 Claims, 10 Drawing Sheets

(51) Int. Cl.
*A47G 9/10* (2006.01)
*B60N 2/885* (2018.01)
*B64D 11/06* (2006.01)

(52) U.S. Cl.
CPC .... *B60N 2002/899* (2018.02); *B64D 11/0642* (2014.12)

(56) References Cited

U.S. PATENT DOCUMENTS

| | | | |
|---|---|---|---|
| 7,938,491 B2* | 5/2011 | Montuore | B60N 2/882 297/397 |
| 8,584,285 B1* | 11/2013 | Sipherd | A47C 7/383 5/636 |
| 9,434,283 B2* | 9/2016 | Spalter | A47C 7/383 |
| 10,561,554 B2* | 2/2020 | Horng | A61G 7/072 |
| 10,575,665 B2* | 3/2020 | Rosenberg | A47G 9/1081 |
| 11,160,400 B1* | 11/2021 | Mani | A47G 9/1045 |
| 11,259,657 B1* | 3/2022 | Molina | A47G 9/0253 |
| 2013/0113262 A1* | 5/2013 | Nam | A47G 9/1081 297/391 |
| 2018/0281638 A1* | 10/2018 | Chu | B60N 2/885 |
| 2022/0185159 A1* | 6/2022 | Kato | B60N 2/80 |
| 2022/0322831 A1* | 10/2022 | Halsall | A47C 7/383 |

* cited by examiner

VEHICLE SEAT

CROSS-REFERENCE TO RELATED APPLICATION

This application is based on and claims priority under 35 USC 119 from Japanese Patent Application No. 2022-049755 filed on Mar. 25, 2022, the disclosure of which is incorporated by reference herein.

BACKGROUND

Technical Field

The present disclosure relates to a vehicle seat.

Related Art

Japanese Patent Application Laid-Open (JP-A) No. H5-24051 discloses a vehicle seat including a seat cushion that supports buttocks of a seated occupant, a seatback that supports the back of the seated occupant, and a headrest that supports the head of the seated occupant. The headrest includes metal stays, a rigid foam body provided so as to surround the stays, and a soft foam body fixed to a front face of the rigid foam body. The head of the occupant seated in the seat is supported by the soft foam body.

There is room for improvement in the vehicle seat described in JP-A No. H5-24051 in relation to effectively suppressing travel sickness of an occupant.

In consideration of the above circumstances, an object of the present disclosure is to obtain a vehicle seat capable of effectively suppressing travel sickness of an occupant.

SUMMARY

A vehicle seat of a first aspect includes a seat cushion that supports buttocks of a seated occupant, a seatback that supports a back of the seated occupant, and a headrest that supports a head of the seated occupant. The headrest includes a first configuration section comprising a hard urethane and formed with an indentation in a front face, the indentation enabling entry of a supported portion, and the supported portion being a location corresponding to an occipital bone of the head of the seated occupant, and a second configuration section comprising a soft urethane having a lower rigidity than the hard urethane, the second configuration section being provided at the indentation so as to be deformed by the supported portion. Part of the first configuration section, which is a bottom face of the indentation, is configured by a left-right pair of head support faces that support the supported portion through the deformed second configuration section and that are connected together at a connection location having a straight line shape. An angle formed between cross-sections of the left and right head support faces when sectioned along a plane perpendicular to the connection location is first angle that is from 37.2° to 143°. An angle formed between a direction perpendicular to the connection location and a seat front-rear direction when viewed along a seat left-right direction is a second angle that is from 12.8° to 68.7°.

In the vehicle seat of the first aspect, when the seated occupant has sat on the seat, the supported portion, which is the location corresponding to the occipital bone and is part of the head of the seated occupant, becomes in close proximity to the first configuration section while deforming the second configuration section. The supported portion is at this time supported by the left and right head support faces of the first configuration section through the deformed second configuration section. Swaying of the head of the seated occupant is thereby accordingly suppressed, suppressing travel sickness of the seated occupant.

In the vehicle seat of the first aspect, the angle formed by the left and right head support faces at the cross-sections of the left and right head support faces sectioned along a plane perpendicular to the connection location is first angle that is from 37.2° to 143°. The angle formed between the direction perpendicular to the connection location and the seat front-rear direction when viewed along the seat left-right direction is the second angle in a range that is from 12.8° to 68.7°. This thereby more effectively suppresses travel sickness of the seated occupant than in a configuration in which the first angle and the second angle are set outside the above ranges.

A vehicle seat of a second aspect is the vehicle seat of the first aspect, wherein the first angle is from 70.5° to 124.5° and the second angle is from 31.1° to 56.6°.

In the vehicle seat of the second aspect the first angle is from 70.5° to 124.5° and the second angle is from 31.1° to 56.6°. This thereby more effectively suppresses travel sickness of the seated occupant than in a configuration in which the first angle and the second angle are set outside the above ranges.

The vehicle seat of the third aspect is the vehicle seat of the first aspect or the second aspect, wherein the head support faces are flat surfaces.

The vehicle seat of the third aspect effectively suppresses travel sickness of plural seated occupants having various sizes of head (supported portion).

The vehicle seat according to the present disclosure exhibits the excellent advantageous effect of enabling travel sickness of an occupant to be effectively suppressed.

BRIEF DESCRIPTION OF THE DRAWINGS

Exemplary embodiments of the present disclosure will be described in detail based on the following figures, wherein.

DETAILED DESCRIPTION

Figure 1:
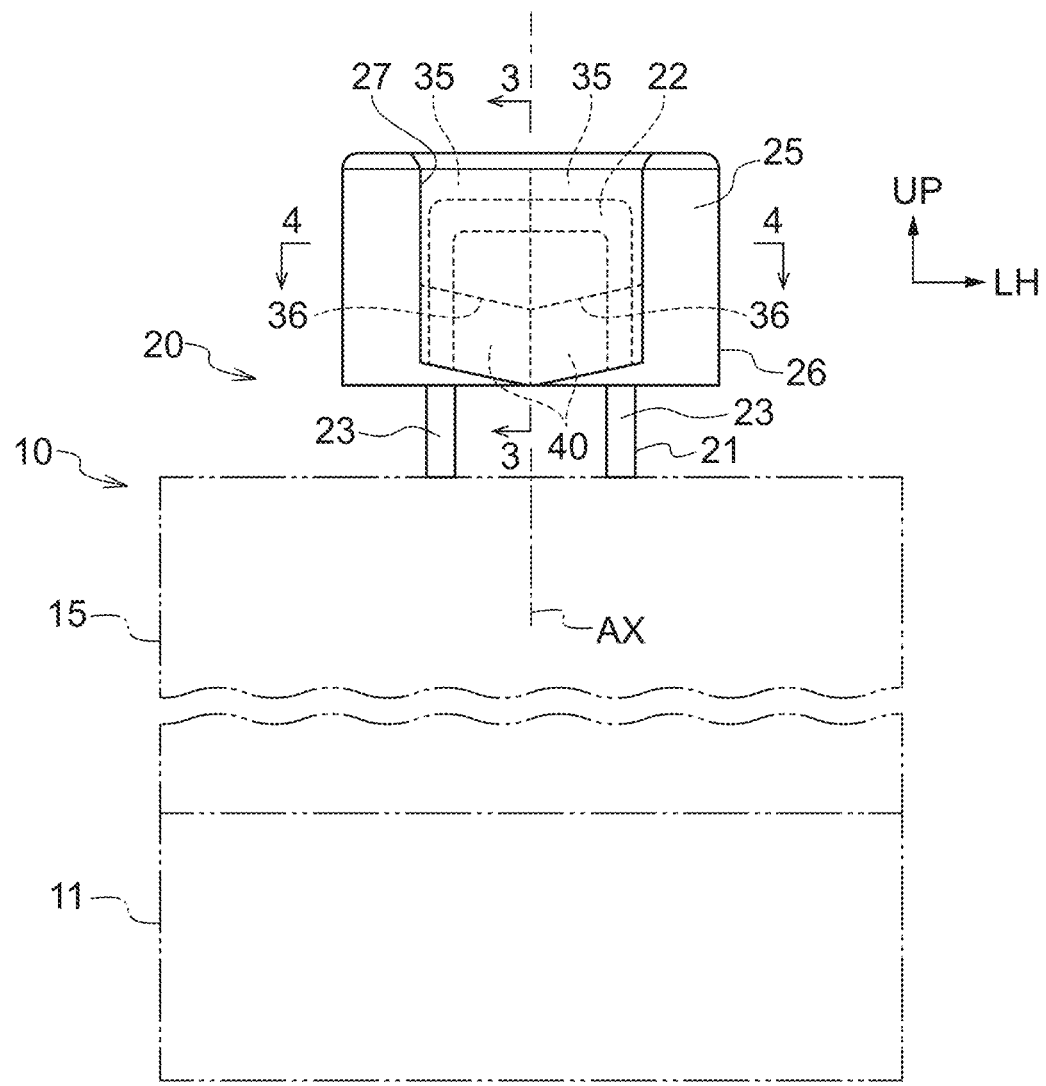
FIG. 1 is a front view of a vehicle seat of an exemplary embodiment.

Explanation follows regarding a vehicle seat 10 (hereafter referred to as seat 10) according to an exemplary embodiment of the present disclosure, with reference to the drawings. Note that as appropriate in the drawings, arrow FR indicates a seat forward direction, arrow UP indicates a seat upward direction, and arrow LH indicates a left side in a seat left-right direction (seat width direction). When in the following description reference is simply made to front-rear, left-right, and height (up-down) directions these respectively indicate front-rear in the seat front-rear direction, left-right in the seat left-right direction, and up-down in the seat height direction.

The seat 10 illustrated in FIG. 1 is installed to a floor surface of a vehicle cabin of a vehicle (omitted in the drawings). The seat 10 includes a seat cushion 11 that is supported by the floor surface through a slide rail system (omitted in the drawings), a seatback 15 having a lower edge connected to a rear edge of the seat cushion 11, and a headrest 20 supported by a top edge of the seatback 15. The seat cushion 11 supports the buttocks of a seated occupant P from below (see FIG. 6 to FIG. 8). The seatback 15 supports the back of the seated occupant P from the rear. The headrest 20 supports the head P1 of the seated occupant from the rear. Note that the seatback 15 is able to be reclined in front and rear directions with respect to the seat cushion 11.

The headrest 20 includes a headrest frame 21, a first configuration section 25, a second configuration section 45, and a cover member (omitted in the drawings) as described later.

As illustrated in FIG. 1, the headrest frame 21 is provided inside the headrest 20. The headrest frame 21 is configured from metal pipes. A front view shape of the headrest frame 21 is a substantially U-shape. The headrest frame 21 includes an upper end configuration section 22 extending along the left-right direction, and a left-right pair of side configuration sections 23 extending downward from left-right end portions of the upper end configuration section 22. The lower end portions of the left-right side configuration sections 23 are fixed to upper edge portions of the seatback 15. Note that the lower end portions of the left-right side configuration sections 23 may be supported by the upper edge portions of the seatback 15 so as to be slidable in the extension direction of the side configuration sections 23. The headrest 20 has left-right symmetry in front view with respect to a center line AX, wherein the center line AX is defined as extending in the height direction so as to pass through a left-right direction center of the headrest 20. Note that in the following description the left-right side configuration sections 23 are parallel to the vertical direction. Namely, the seat height direction is aligned with the vertical direction.

The headrest 20 includes the first configuration section 25 fixed to the headrest frame 21 and positioned surrounding the headrest frame 21. The first configuration section 25 is an integrally molded product made from a hard urethane. A rigidity of the hard urethane is, for example, 20N (Newtons). The first configuration section 25 is, for example, manufactured using a mold (omitted in the drawings).

Figure 3:
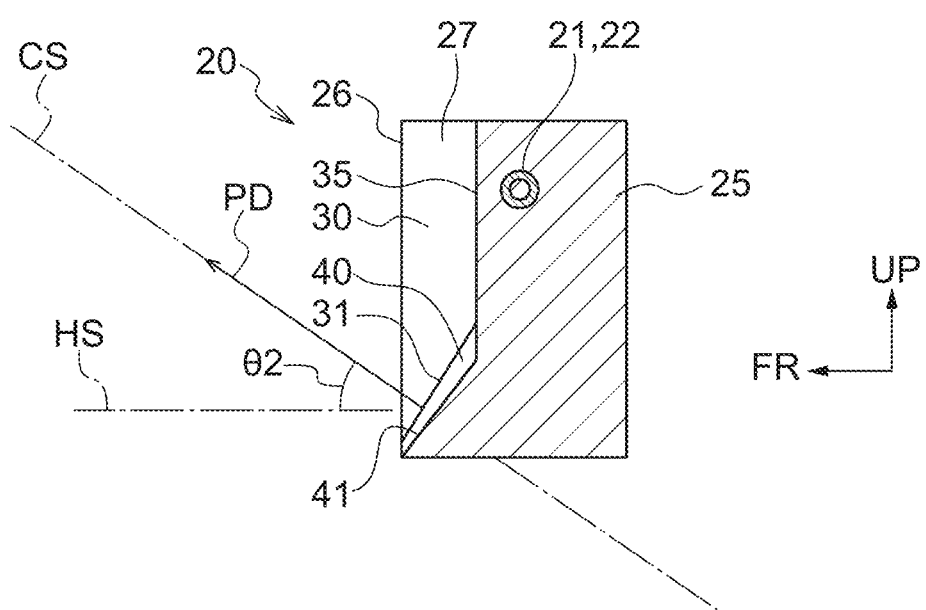
FIG. 3 is a cross-section taken along arrows 3-3 of FIG. 1.

An indentation (recess) 27 is formed in a front face 26 of the first configuration section 25. The indentation 27 has left-right symmetry in front view with respect to the center line AX. A bottom face (inside face) of the indentation 27 includes a left-right pair of side faces 30, a left-right pair of upper configuration faces 35, and a left-right pair of head support faces 40. The left-right side faces 30 are flat surfaces perpendicular to the left-right direction. However, the left-right side faces 30 may be curved faces. As illustrated in FIG. 3, a lower edge 31 of each of the side faces 30 is inclined with respect to the front-rear direction and the height direction in side view.

Figure 4:
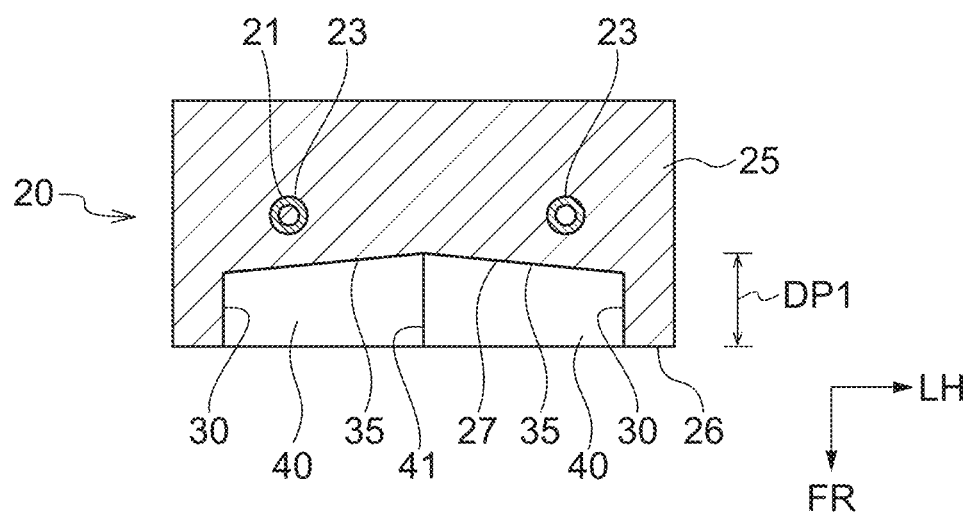
FIG. 4 is a cross-section taken along arrows 4-4 of FIG. 1.

The left-right upper configuration faces 35 configure an upper section of the bottom face of the indentation 27. The left-right upper configuration faces 35 have left-right symmetry with respect to the center line AX in front view. A lower edge 36 of each of the upper configuration faces 35 is inclined with respect to the left-right direction and the height direction in front view. Moreover, as illustrated in FIG. 4, the left-right upper configuration faces 35 are inclined with respect to each other in plan view. As illustrated in FIG. 4, a distance in the front-rear direction between a connection location of the left-right upper configuration faces 35 and the front face 26 of the first configuration section 25 (maximum depth of the indentation 27) is DP1. The distance DP1 is preferably 50 mm or greater.

The left and right head support faces 40 are configured at a lower portion of the bottom face of the indentation 27. The left and right head support faces 40 are flat surfaces. As illustrated in FIG. 1, the left and right head support faces 40 have left-right symmetry with respect to the center line AX in front view. The shape of each of the left and right head support faces 40 is a substantially parallelogram shape as viewed from a direction perpendicular to each head support face 40. A right side edge portion of the left side head support face 40 and a left side edge portion of the right side head support face 40 are connected together through a straight line shaped connection location 41. The left side edge portion of the left side head support face 40 and the right side edge portion of the right side head support face 40 are each connected to the lower edge 31 of the respective left or right side face 30. Upper edge portions of the left and right head support faces 40 are each connected to the lower edge 36 of the respective left or right upper configuration face 35.

Figure 2:
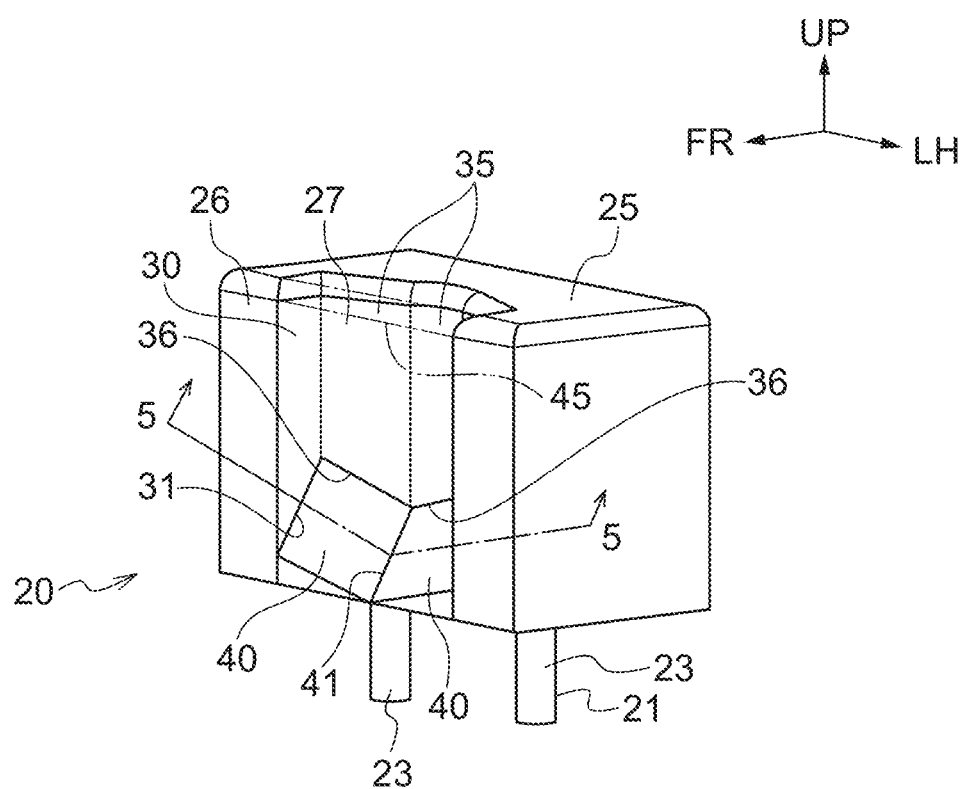
FIG. 2 is a perspective view of a headrest.
Figure 5:
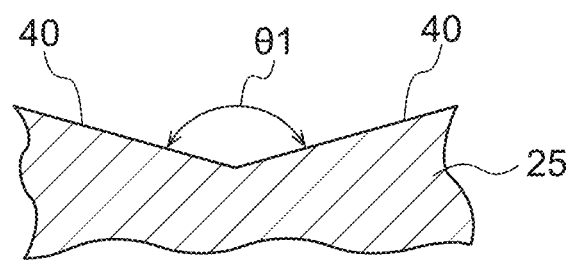
FIG. 5 is a cross-section taken along arrows 5-5 of FIG. 2.

As illustrated in FIG. 5, cross-sections of the left and right head support faces 40 intersect with each other at a first angle $\theta 1$ when the left and right head support faces 40 are sectioned along the arrows 5-5 of FIG. 2. In other words, an angle formed between the left and right head support faces 40 sectioned along a flat plane CS perpendicular to the connection location 41 (see FIG. 3) is the first angle $\theta 1$.

As illustrated in FIG. 3, an angle formed between a direction PD perpendicular to the connection location 41 and a seat front-rear direction (horizontal plane HS) when the headrest 20 is viewed along the left-right direction is a second angle $\theta 2$.

As illustrated in FIG. 1 and FIG. 2, the headrest 20 includes the second configuration section 45. The shape of the second configuration section 45 is substantially the same as the shape of the indentation 27 of the first configuration section 25. The second configuration section 45 is fitted into the indentation 27. Thus an overall shape of a single body configured from the first configuration section 25 and the second configuration section 45 is substantially a cuboidal shape. The second configuration section 45 is an integrally formed component made from soft urethane. The rigidity of this soft urethane is less than the rigidity of the hard urethane referred to above and is, for example, a rigidity of 4N (Newtons) or less. The second configuration section 45 is, for example, manufactured using a mold (omitted in the drawings).

Although omitted in the drawings, an outer peripheral face of the integrated body of the first configuration section 25 and the second configuration section 45 is covered by a cover member configured from a flexible material. The integrated state of the first configuration section 25 and the second configuration section 45 is maintained by the cover member.

Figure 6:
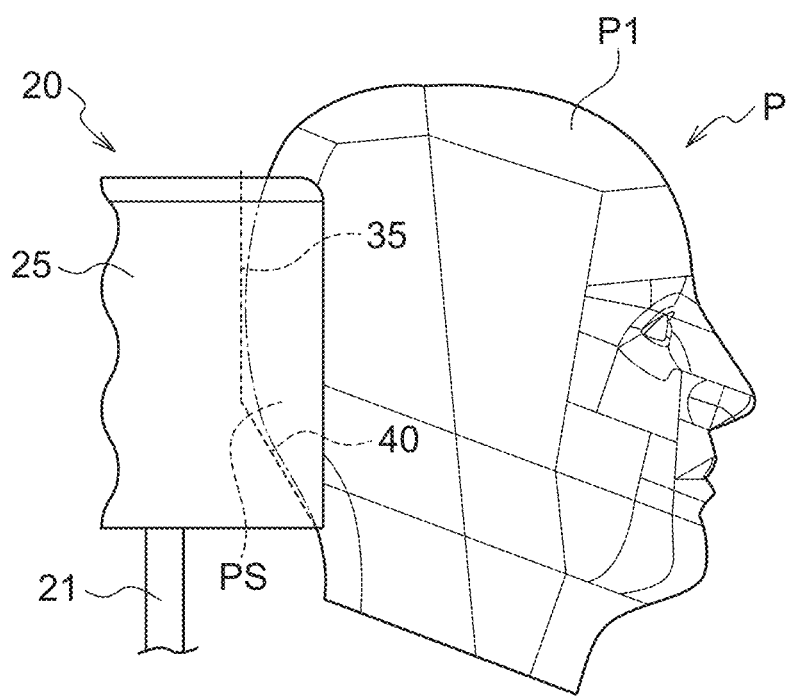
FIG. 6 is a side view illustrating a headrest and a head of a seated occupant.
Figure 7:
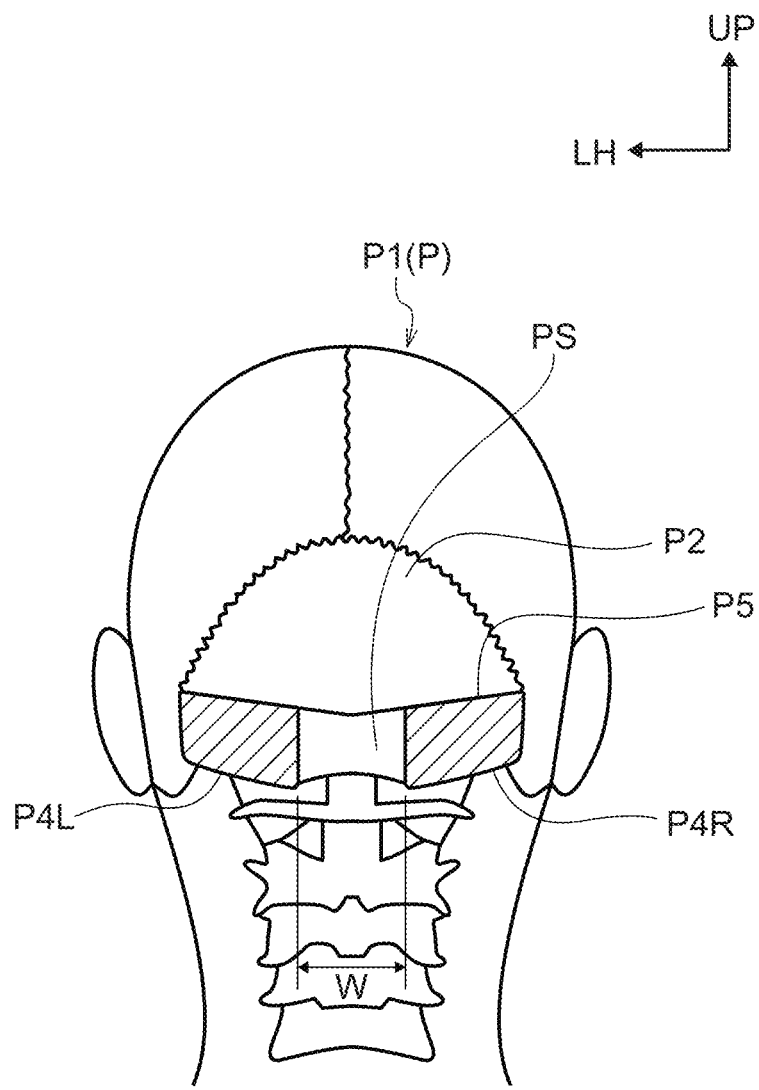
FIG. 7 is a back view of a head as viewed from a rear side.
Figure 8:
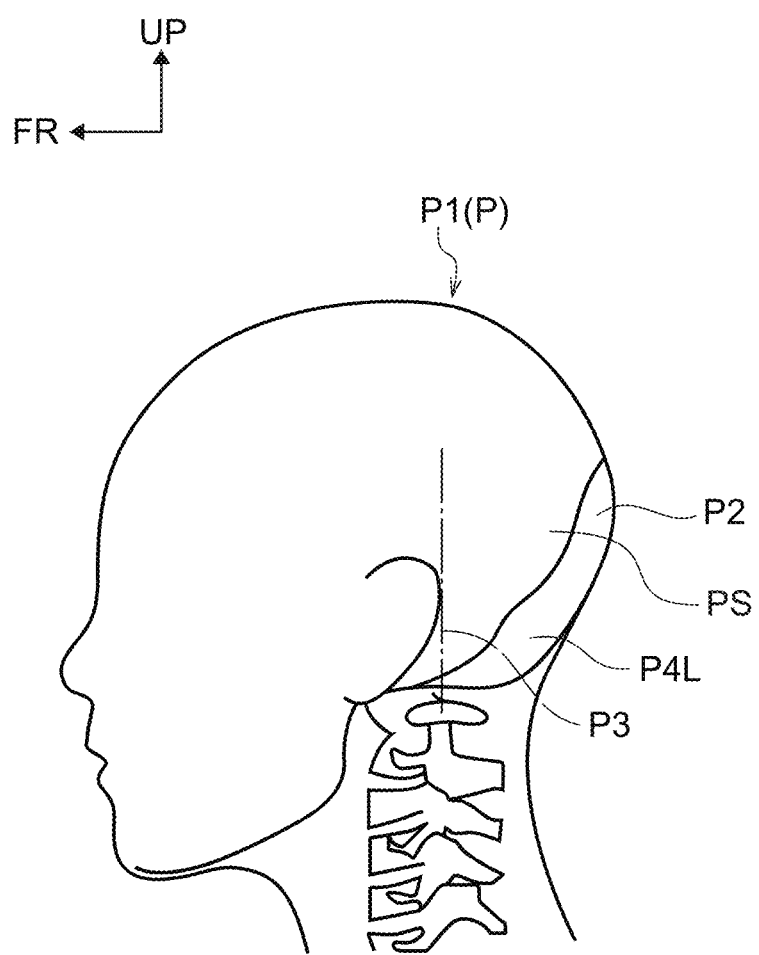
FIG. 8 is a side view of a head as viewed from a left side.

When the seated occupant P is seated on the seat 10, as illustrated in FIG. 6 to FIG. 8, a supported portion PS, which is a location corresponding to the occipital bone P2 on the head P1 of the seated occupant P, is in close proximity to the left and right head support faces 40 of the first configuration section 25 while deforming the cover member and the second configuration section 45 (while indenting them rearward). Furthermore, as viewed from the seat side face, the left and right head support faces 40 overlap in the left-right direction with the supported portion PS of the seated occupant P. Moreover, the left and right head support faces 40 are set with a shape, dimensions, and the like such that the left and right head support faces 40 only support locations further to a rear side than the mastoid process P3 of the head P1 of the seated occupant P.

The angles of the first angle θ1 and the second angle θ2 are set to respective angular ranges such that, when the supported portion PS is disposed between the left and right head support faces 40 and is supported by the left and right head support faces 40 through the deformed cover member and second configuration section 45, a right side location P4R of the supported portion PS receives a high pressure from the right side head support face 40 through the cover member and the second configuration section 45, and a left side location P4L of the supported portion PS receives a high pressure from the left side head support face 40 through the cover member and the second configuration section 45. Note that the right side location P4R and the left side location P4L are locations respectively corresponding to the two left and right side portions at a lower edge portion of the occipital bone P2. Note that the lower edge portion of the occipital bone P2 is a portion further to a lower side than the superior nuchal line P5 of the occipital bone P2. The right side location P4R and the left side location P4L are positioned at the same height as each other in a state in which the head P1 of the seated occupant P is facing directly forwards. Moreover, although depending on the size of the head P1 of the seated occupant P, a separation W in the left-right direction between the right side location P4R and the left side location P4L may be assumed to be approximately 90 mm to 120 mm. Setting the shape and dimensions of the left-right pair of head support faces 40 under this assumption for the separation W enables compatibility with plural seated occupants P who have various builds (sizes) of adult males and adult females.

Operation and Advantageous Effects of Present Exemplary Embodiment

Next, description follows regarding the operation and advantageous effects of the present exemplary embodiment.

In the seat 10 of the present exemplary embodiment as described above, the buttocks, the back, and the head P1 of the seated occupant P are respectively supported by the seat cushion 11, the seatback 15, and the headrest 20. The supported portion PS of the head P1 of the seated occupant P is also in close proximity to the first configuration section 25 while deforming the cover member and the second configuration section 45. The supported portion PS is supported at this time by the left and right head support faces 40 of the first configuration section 25 through the deformed cover member and second configuration section 45. More specifically, the supported portion PS is supported from the seat left-right directions by the left and right head support faces 40, and is supported from the seat rear side in a forward direction and a diagonally upward direction. Swaying of the head P1 of the seated occupant P is thereby suppressed, and travel sickness of the seated occupant P is also suppressed.

Furthermore, the locations where the head support faces 40 are formed are not configured so as to be moveable, enabling the first configuration section 25 (and the headrest 20) to be manufactured cost effectively.

Furthermore, the locations where the head support faces 40 are formed are covered by the second configuration section 45, such that the front face of the headrest 20 (cover member) less liable to suffer from formation of undulations therein. In other words the styling of the headrest 20 is not likely to be degraded.

The distance DP1 in the front-rear direction from the connection locations between the left-right upper configuration faces 35 and the front face 26 of the first configuration section 25 is set to 50 mm or greater. This makes it unlikely that the head P1 will be supported by the left-right upper configuration faces 35 through the deformed cover member and second configuration section 45 before the supported portion PS is supported by the left and right head support faces 40 through the deformed cover member and second configuration section 45. Namely, by setting the distance DP1 to 50 mm or greater, a distance between the supported portion PS and the left and right head support faces 40 is not liable to become longer than an appropriate distance, reducing any concern that the supported portion PS will no longer be supported by the left and right head support faces 40.

Along with recent trends towards the automation of driving in vehicles, concerns are increasing that travel sickness might become more serious during autonomous driving of vehicles. Such travel sickness is known to arise from an inconsistency in sensation between the vestibular system and visual system when the head of an occupant is swaying. In addition thereto, such travel sickness is known to be able to be reduced by reducing the amount of discrepancy in sensation between the vestibular system and the visual system of the occupant. Setting the first angle θ1 and the second angle θ2 of the left and right head support faces 40 to appropriate magnitudes is accordingly important to suppress swaying of the head that is a cause of travel sickness. Thus the present applicants have performed the following tests to obtain applicable ranges for the first angle θ1 and the second angle θ2 in the seat 10 not accompanied by the seated occupant P feeling uncomfortable.

Figure 9:
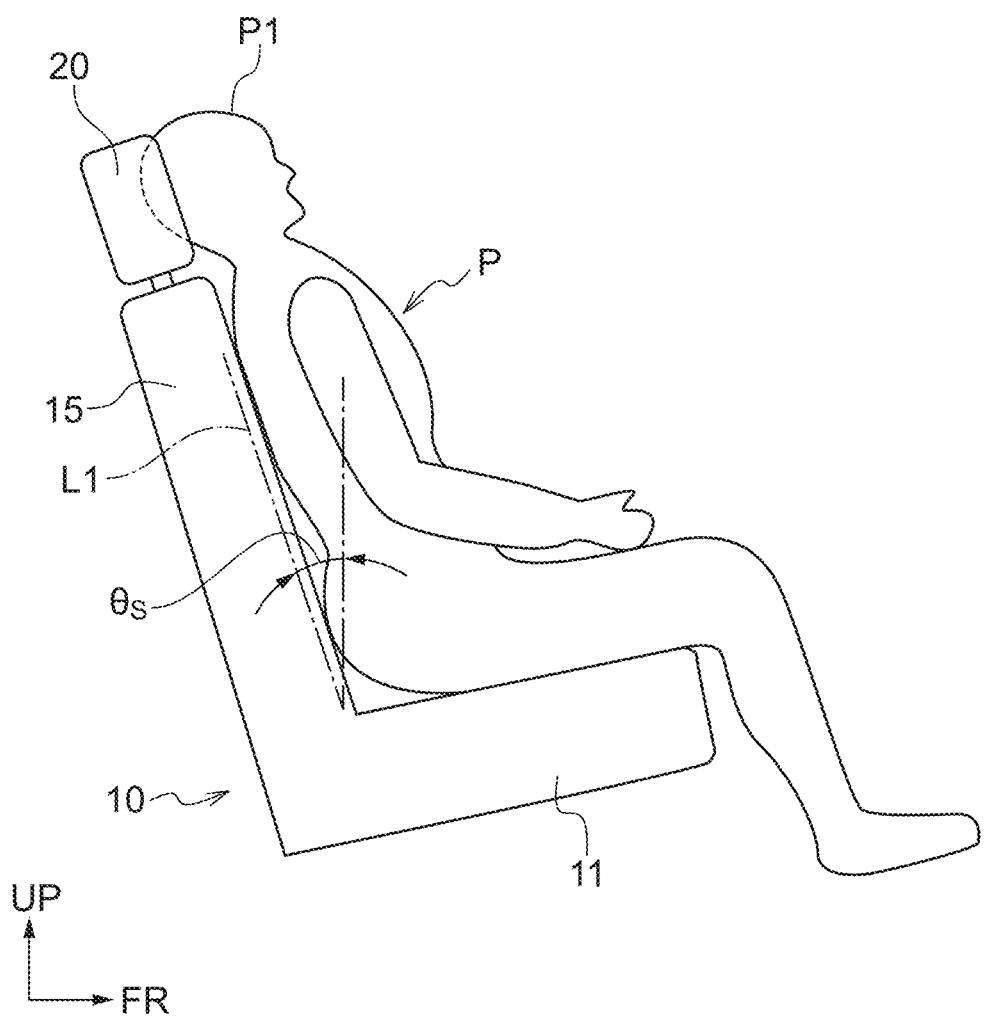
FIG. 9 is a side view schematically illustrating a vehicle seat and a seated occupant.

In these tests the seat 10 is repeatedly oscillated left and right between a position tilted 10° toward the left side with respect to the height direction, and a position tilted 10° toward the right side thereof. The frequency of this oscillation is 0.1 Hz. These tests are performed in an upright posture as illustrated in FIG. 9. Note that the upright posture is a ride posture that enables the seated occupant P to look in front of the vehicle. As an example, in the present tests a reclining angle θs of the seatback 15 was set to 23.2°. The single dot broken line L1 illustrated in FIG. 9 is a reference line of a reclining angle θs. The single dot broken line L1 corresponds to a backrest surface configuring the seatback 15. Reference here to the backrest surface means a central portion of the seatback 15 in the seat width direction of the surface supporting the lumber region of the seated occupant P from the seat rear side. The reclining angle θs is measured in a state in which there is no occupant seated on the seat 10.

Ten test subject performed the tests, with the BMI expressing the build of these ten persons being from 18.7 to 29.4. Note that body mass index (BMI) is an build index computed from body weight and height, and is a value computed by equation $M/(L^2)$, wherein M is body weight in kg, and L is height in m.

In these tests the ranges of the first angle θ1 and the second angle θ2 were measured when the ten test subjects experienced the following sensations (1), (2), and (3):

(1) optimal support to the head P1 by the left-right pair of head support faces 40;

(2) appropriate, but not unpleasant, support to the head P1 by the left-right pair of head support faces 40; and (3) substantially no support to the head P1 by the left-right pair of head support faces 40.

Figure 10:
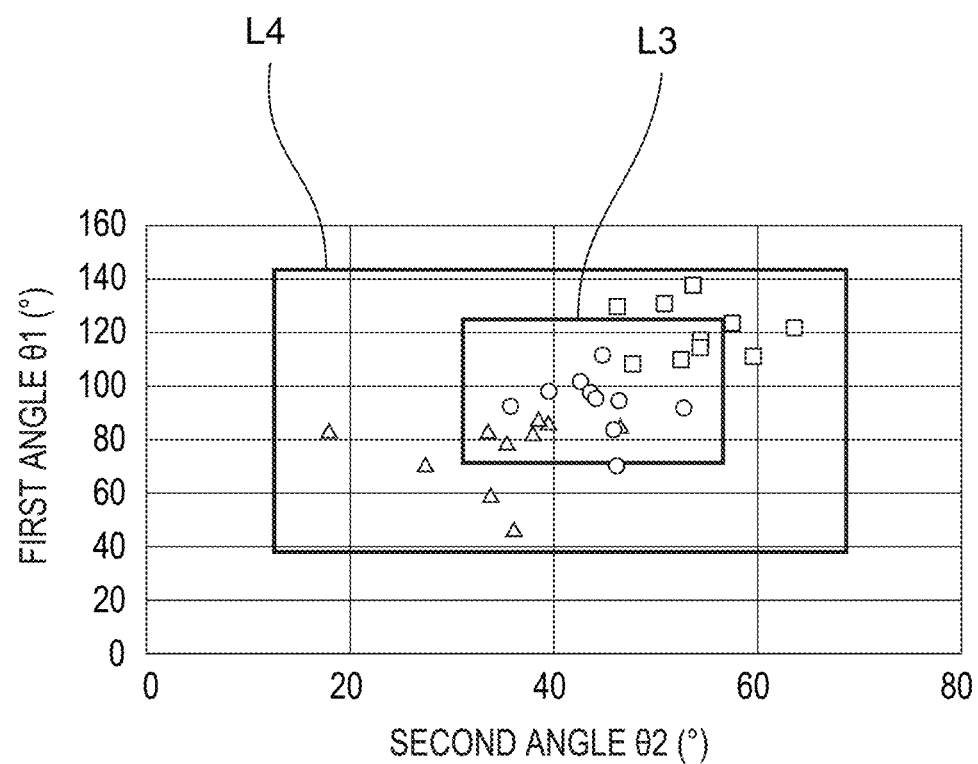
FIG. 10 is a graph illustrating test results.

FIG. 10 illustrates a graph plotted with the first angle θ1 and the second angle θ2 when the ten test subjects experienced the above sensations (1), (2), and (3). The range of first angle θ1 and the second angle θ2 when the ten test subjects experienced the sensation (1) decided an "optimum range". The range of first angle θ1 and the second angle θ2 when the ten test subjects experienced the sensation (2) decided a "permissible range". Note that in the graph illustrated in FIG. 10 the optimum range is surrounded by line L3, and the permissible range is surrounded by line L4. The square shaped plot points are positions each of the test subjects evaluated as an upper limit angle (i.e. if the range of the first and second angles becomes any wider than this, support is not obtained). The circular shaped plot points are positions each of the test subjects evaluated as an optimal angle. The triangular shaped plot points were evaluated as a lower limit angle (i.e. if the range of the first and second angles becomes any narrower than this, an uncomfortable feeling results). Outside of the range surrounded by the permissible range line L4 is a range where the ten test subjects experienced the sensation (3). The optimum range and the permissible range are ranges of −3σ+3σ from the average value of the first angle θ1 and the second angle θ2 measured in the above tests. Note that σ is the standard deviation obtained for the first angle θ1 and the second angle θ2 as measured in the above tests.

A summary of the results of the above tests is the optimum range and the permissible range for the first angle θ1 and the second angle θ2 as set out in Table 1 below.

TABLE 1

| | First Angle (°) | Second Angle (°) |
|---|---|---|
| Lower Limit of Permissible Angle | 37.2 | 12.8 |
| Lower Limit of Optimal Angle | 70.5 | 31.3 |
| Upper Limit of Optimal Angle | 124.5 | 56.6 |
| Upper Limit of Permissible Angle | 143.0 | 68.7 |

Setting the first angle θ1 in the range of from 37.2° to 143° together with setting the second angle θ2 in the range from 12.8° to 68.7° results in the seated occupant P whose head P1 is supported by the left and right head support faces 40 being hard to feel uncomfortable. This thereby enables travel sickness of the seated occupant P to be effectively suppressed.

Moreover, setting the first angle θ1 in the range of from 70.5° to 124.5° together with setting the second angle θ2 in the range from 31.1° to 56.6° results in the seated occupant P whose head P1 is supported by the left-right pair of head support faces 40 being less likely to feel uncomfortable. This thereby enables travel sickness of the seated occupant P to be effectively suppressed.

Furthermore, the left and right head support faces 40 of the first configuration section 25 are flat surfaces. The left and right head support faces 40 are accordingly able to support various sizes (shapes) of head (supported portion) and also the seated occupant whose head is supported is not liable to feel uncomfortable. The seat 10 is accordingly able to effectively suppress travel sickness of plural seated occupants having various sizes of head (supported portion). Note that suppose the head support faces 40 were formed by curved faces, then when a head (supported portion) of a particular size (shape) was supported by such head support faces 40, the seated occupant whose head was supported would not be liable to feel uncomfortable. However, in cases in which the head support faces 40 were formed by curved faces, then were these head support faces 40 to be employed to support a head (supported portion) of a different size (shape), then there would be a greater concern that the seated occupant whose head is supported would feel uncomfortable than with the head support faces 40 configured by flat surfaces.

Although the present disclosure has been described by way of an exemplary embodiment, the present disclosure is not limited to this exemplary embodiment.

The head support faces 40 are not necessarily flat surfaces.

The first configuration section 25 may be configured such that the left-right upper configuration faces 35 are arranged along a straight line in plan view. In such cases the distance (depth of the indentation 27) in the front-rear direction from the upper configuration faces 35 to the front face 26 of the first configuration section 25 is preferably 50 mm or greater.

What is claimed is:

1. A vehicle seat comprising:
    a seat cushion that supports buttocks of a seated occupant;
    a seatback that supports a back of the seated occupant; and
    a headrest that supports a head of the seated occupant,
        wherein the headrest includes:
            a first configuration section comprising a hard urethane and formed with an indentation in a front face, the indentation enabling entry of a supported portion, and the supported portion being a location corresponding to an occipital bone of the head of the seated occupant; and
            a second configuration section comprising a soft urethane having a lower rigidity than the hard urethane, the second configuration section being provided at the indentation so as to be deformed by the supported portion,
        wherein:
            a part of the first configuration section, which is a bottom face of the indentation, is configured by a left-right pair of head support faces that support the supported portion through the deformed second configuration section and that are connected together at a connection location having a straight line shape;
            an angle formed between cross-sections of the left-right pair of head support faces when sectioned along a plane perpendicular to the connection location is a first angle that is from 37.2° to 143°; and
            an angle formed between a direction perpendicular to the connection location and a seat front-rear direction when viewed along a seat left-right direction is a second angle that is from 12.8° to 68.7°.

2. The vehicle seat of claim 1, wherein the first angle is from 70.5° to 124.5°, and the second angle is from 31.1° to 56.6°.

3. The vehicle seat of claim 1, wherein the left-right pair of head support faces are flat surfaces.

* * * * *